United States Patent
Ushida et al.

(10) Patent No.: US 9,772,493 B2
(45) Date of Patent: Sep. 26, 2017

(54) HEAD-UP DISPLAY SUPPORT STRUCTURE FOR REFLECTION UNIT

(71) Applicant: NIPPON SEIKI CO., LTD., Niigata (JP)

(72) Inventors: Norihiko Ushida, Niigata (JP); Yuji Oguro, Niigata (JP); Hiroyuki Furusawa, Niigata (JP); Kouichi Jinushi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 90 days.

(21) Appl. No.: 14/435,140

(22) PCT Filed: Oct. 4, 2013

(86) PCT No.: PCT/JP2013/077073
§ 371 (c)(1),
(2) Date: Apr. 10, 2015

(87) PCT Pub. No.: WO2014/065097
PCT Pub. Date: May 1, 2014

(65) Prior Publication Data
US 2015/0286054 A1  Oct. 8, 2015

(30) Foreign Application Priority Data
Oct. 24, 2012  (JP) .................................. 2012-234827

(51) Int. Cl.
*G09G 5/00* (2006.01)
*G02B 27/01* (2006.01)
(Continued)

(52) U.S. Cl.
CPC .......... *G02B 27/0149* (2013.01); *B60K 35/00* (2013.01); *B60R 11/0235* (2013.01);
(Continued)

(58) Field of Classification Search
CPC ........ G09G 3/002; G09G 3/36; G09G 3/3648; G09G 2380/10; G09G 2380/12
(Continued)

(56) References Cited

U.S. PATENT DOCUMENTS 6,799,893 B2   10/2004 Hokkirigawa et al.
9,188,781 B2 * 11/2015 Kobayashi ............. B60K 35/00
(Continued)

FOREIGN PATENT DOCUMENTS

JP   10-227991 A    8/1998
JP   2002-250343 A  9/2002
(Continued)

OTHER PUBLICATIONS

International Search Report issued in International Application No. PCT/JP2013/077073 dated Jan. 7, 2014, with English translation.

*Primary Examiner* — Alexander Eisen
*Assistant Examiner* — Nelson Lam
(74) *Attorney, Agent, or Firm* — McDermott Will & Emery LLP

(57) ABSTRACT

Provided is a head-up display device such that shaking of a display image due to vibration can be mitigated. This head-up display device, which reflects display light output from a display unit with a reflection unit so as to produce an image to be viewed, includes a first supporting part for supporting the reflection unit rotatably about a rotation axis and a first supported part provided at one end of the reflection unit and supported by the first supporting part. The first supported part has a spherical surface formed thereon, and the first supporting part has a sliding surface that is formed therein and is in substantially point contact or line contact with the spherical surface formed on the first supported part. A first elastic member that presses the first (Continued)

supported part and the first supporting part against each other in the rotation axis direction is provided.

5 Claims, 7 Drawing Sheets

(51) Int. Cl.
    *B60K 35/00*     (2006.01)
    *G02B 27/64*     (2006.01)
    *B60R 11/02*     (2006.01)
    *B60R 11/00*     (2006.01)

(52) U.S. Cl.
    CPC ...... *G02B 27/646* (2013.01); *B60K 2350/405* (2013.01); *B60K 2350/406* (2013.01); *B60R 2011/0085* (2013.01); *B60R 2011/0092* (2013.01); *G02B 2027/0169* (2013.01)

(58) Field of Classification Search
    USPC .................................. 345/7–9; 359/630–632
    See application file for complete search history.

(56) References Cited

U.S. PATENT DOCUMENTS

| | | | | |
|---|---|---|---|---|
| 2002/0166273 | A1* | 11/2002 | Nakamura | G02B 27/0101 40/593 |
| 2003/0214474 | A1* | 11/2003 | Aoki | B60K 35/00 345/87 |
| 2006/0022896 | A1* | 2/2006 | Kumon | G02B 27/0149 345/7 |
| 2006/0203351 | A1* | 9/2006 | Kageyama | G02B 27/0101 359/630 |
| 2011/0061482 | A1* | 3/2011 | Maruyama | F16H 25/2015 74/89.23 |
| 2011/0134498 | A1* | 6/2011 | Ohta | G02B 27/01 359/200.7 |
| 2011/0241596 | A1* | 10/2011 | Sasaki | G05B 19/402 318/685 |
| 2015/0098133 | A1* | 4/2015 | Laycock | G02B 7/1827 359/632 |

FOREIGN PATENT DOCUMENTS

| | | |
|---|---|---|
| JP | 2008-185790 A | 8/2008 |
| JP | 2012-163630 A | 8/2012 |

* cited by examiner

HEAD-UP DISPLAY SUPPORT STRUCTURE FOR REFLECTION UNIT

RELATED APPLICATIONS

This application is the U.S. National Phase under 35 U.S.C. §371 of International Application No. PCT/JP2013/077073, filed on Oct. 4, 2013, which in turn claims the benefit of Japanese Application No. 2012-234827, filed on Oct. 24, 2012, the disclosures of which Applications are incorporated by reference herein.

TECHNICAL FIELD

The present invention relates to a head-up display device.

BACKGROUND ART

There is known a head-up display (HUD) device having a display unit to emit display light representing a predetermined image, and projecting the display light from the display unit to a front glass or the like of a vehicle, via a reflection member such as a concave surface mirror to cause a user to visually recognize a display image.

In Patent Literature 1, there is disclosed a HUD device which is provided with: a holder to hold a reflection member; and a supporting part to turnably support a holder member about a turning axis, and which is structured to rotatably retain the reflection member. The HUD device according to Patent Literature 1 has a structure in which: one pair of first and second supported parts are provided so as to sandwich the reflection member along the turning axis therebetween; the supporting part is made of a first supporting part to support the first supported part and a second supporting part to support the second supported part; between the first supporting part and the first supported part, a gap to permit movement of the first supporting part is provided; and a restraining part to restrain movement of the second supported part in a turning axis direction of the second supported part is provided at a side at which the second supporting part and the second supported part are disposed.

CITATION LIST

Patent Literature

Patent Literature 1: Japanese Unexamined Patent Application Publication No. 2008-185790

SUMMARY OF THE INVENTION

Problems to be Solved by the Invention

In the structure of the HUD device according to Patent Literature 1, a gap exists between the first supporting part and the first supported part, and therefore, if vibration is imparted to the HUD device, there may be a case in which the reflection member vibrates while displacing in the turning axis direction in particular. If the reflection member to reflect the display light from the display unit vibrates, as a result, shaking occurs to the display image that is visually recognized, and there has been room to be improved.

The present invention has been made in view of the circumstance described above, and it is an object of the present invention to provide a head-up display device which is capable of reducing shaking of the display image due to the vibration imparted.

Solution to Problem

According to an aspect of the present invention, a head-up display device in which display light representing a predetermined image emitted from a display unit is reflected by a reflection unit, and by the display light that is reflected by the reflection unit, a virtual image of the image can be visually recognized, the device comprising: a supporting part to rotatably support the reflection unit about a determined rotation axis; and a supported part which is provided at one end part of the reflection unit along the rotation axis, and which is supported by the supporting part, wherein a spherical surface is formed at the supported part, a sliding surface which is a surface substantially coming into point contact or linear contact with the spherical surface that is formed at the supported part, and which is a surface for the supported part to slide concurrently with rotation of the reflection unit, is formed at the supporting part, and an elastic member to press the supported part and the supporting part against each other in the rotation axis direction is provided.

According to the aspect of the present invention, the sliding surface that is formed at the supporting part is in a shape along a side surface of a cone or a triangular pyramid having a height direction along the rotation axis.

According to the aspect of the present invention, further comprising: a second supported part which is provided, in a case where the supporting part is defined as a first supporting part, and the supported part is defined as a first supported part, at an end part opposite to the first supported part of the reflection unit along the rotation axis; and a second supporting part to rotatably support the second supported part about the rotation axis, wherein a spherical surface is formed at the second supported part, a sliding surface which is a surface substantially coming into point contact or linear contact with the spherical surface that is formed at the second supported part, and which is a surface for the second supported part to slide concurrently with rotation of the reflection unit, is formed at the second supporting part, and an elastic member to press the second supported part and the second supporting part against each other in a direction which is orthogonal to the rotation axis is provided.

According to the aspect of the present invention, the sliding surface that is formed at the second supporting part is in a shape along a side surface of a cone or a triangular pyramid.

According to the aspect of the present invention, further comprising driving means for rotating the reflection unit and a holder to hold the driving means, wherein the first supporting part is provided at the holder.

According to an aspect of the present invention, a head-up display device in which display light representing a predetermined image emitted from a display unit is reflected by a reflection unit, and by the display light that is reflected by the reflection unit, a virtual image of the image can be visually recognized, the device comprising: a supporting part to rotatably support the reflection unit about a predetermined rotation axis; and a supported part which is provided at one end part of the reflection unit along the rotation axis, and which is supported by the supporting part, wherein a spherical surface is formed at the supported part, a sliding surface which is a surface substantially coming into point contact or linear contact with the spherical surface that is formed at the supporting part, and which is a surface sliding with respect to the supporting part concurrently with rotation of the reflection unit, is formed at the supported part, and an elastic member to press the supported part and the supporting part against each other in the rotation axis is provided.

Effect of the Invention

According to the present invention, shaking of the display image due to vibration imparted can be reduced.

BRIEF DESCRIPTION OF THE DRAWINGS

FIG. 2 (b) is an exploded perspective view of the reflection unit and the reflection unit rotation mechanism that are included in the HUD device according to the embodiment of the present invention.

MODE FOR CARRYING OUT THE INVENTION

A HUD device according to an embodiment of the present invention will be described with reference to the drawings.

Figure 1:
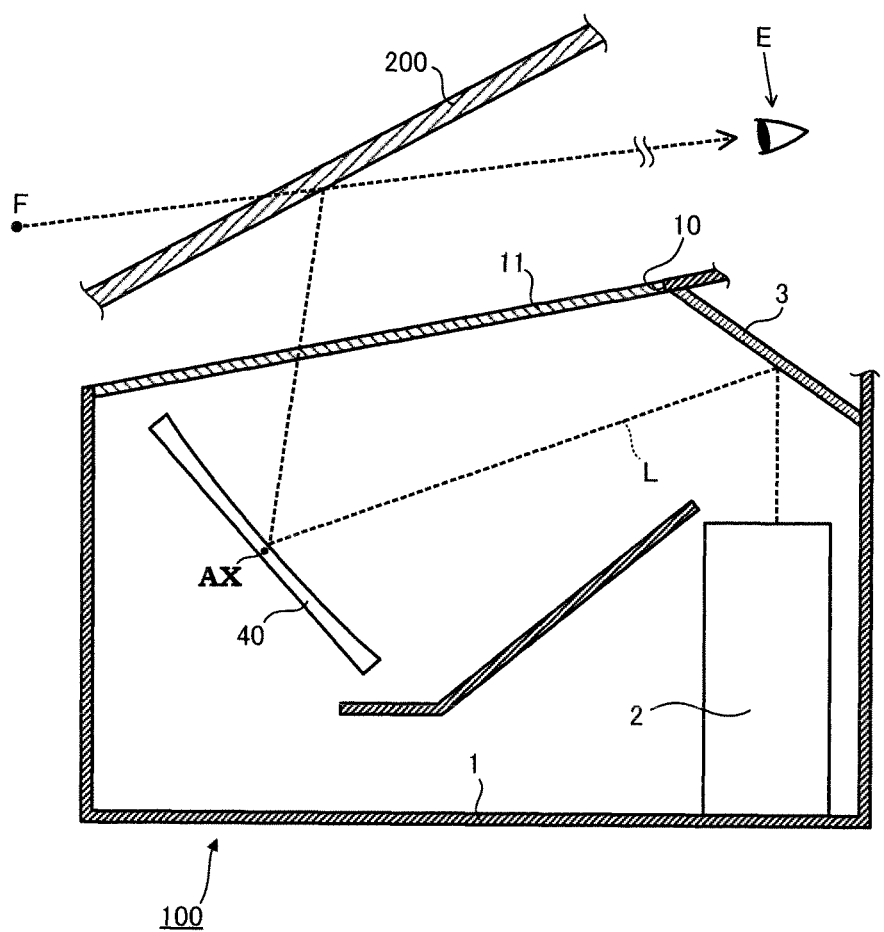
FIG. 1 is a schematic sectional view for explaining a configuration of a HUD device according to an embodiment of the present invention.
Figure 2:
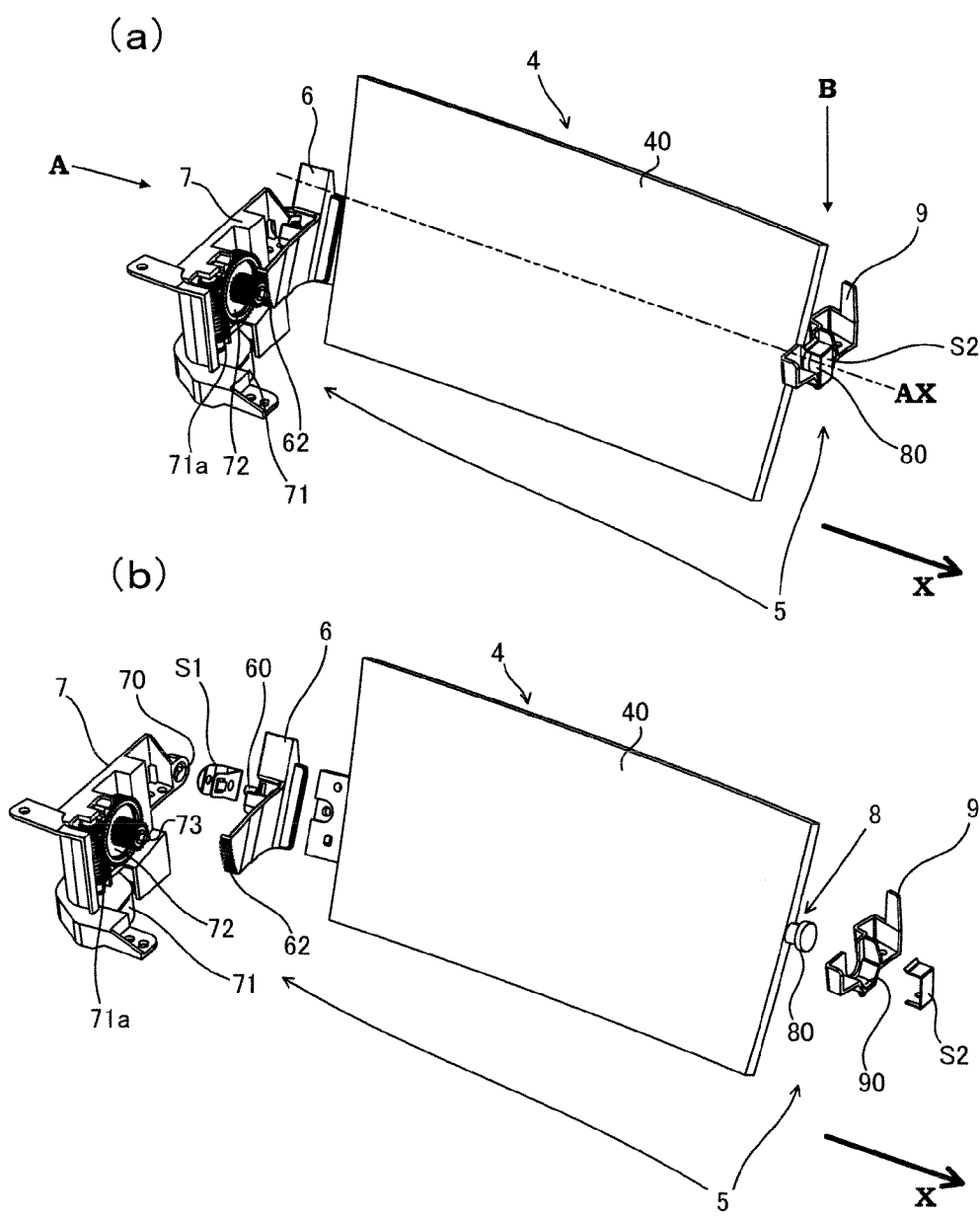
FIG. 2 (a) is a perspective view of a reflection unit and a reflection unit rotation mechanism which are included in the HUD device according to the embodiment of the present invention.

A HUD device 100 is mounted to a motor vehicle, for example, and as shown in FIG. 1 or the like, this device is provided with: a cabinet 1; a display unit 2; a flat surface mirror 3; a reflection unit 4 and a reflection unit rotating mechanism 5 having a reflection member 40 (refer to FIG. 2 (a) and FIG. 2 (b)); and a circuit board which is not shown. It is to be noted that constituent elements other than the reflection member 40 in the reflection unit 4 and the reflection unit rotation mechanism 5 are not shown in FIG. 1.

The HUD device 100 reflects display light L representing a predetermined image emitted from the display unit 2, by the flat surface mirror 3 and the reflection unit 4; emits the reflected light to a front glass 200 of a vehicle on which the HUD device 100 is mounted; and displays contents. The contents thus displayed by the HUD device 100 are a variety of vehicle information, navigation information, or the like.

The cabinet 1 is formed of a synthetic resin, for example, with black, and houses the display unit 2, the flat surface mirror 3, the reflection unit 4, the reflection unit rotation mechanism 5, and the circuit board (not shown) therein. At a portion opposing to the front glass 200, an opening part 10 to cause the display light L, which will be described later, to pass through the front glass 200, is formed, and this opening part 10 is covered with alight transmission cover 11.

The display unit 2 emits the display light L representing an image (a broadcast image) for broadcasting predetermined information (such as a variety of vehicle information or navigation information), and is composed of a transmission type liquid crystal display which is composed of a liquid crystal panel and a backlight light source or a self-light emission type display, for example.

The flat surface mirror 3 reflects the display light L that is emitted from the display unit 2, toward the reflection unit 4.

The reflection unit 4, as shown in FIG. 2 (a) and FIG. 2 (b), has: a reflection member 40 to further reflect the display light L that is reflected by the flat surface mirror 3 and then emit the reflected light toward the front glass 200; and a first supported member 6 and a second supported member 8 which will be described later. The reflection member 40 is made of a concave surface mirror forming a reflection film by means such as vapor deposition on a surface of a substrate made of a synthetic resin material, for example.

The display light L that is reflected by the reflection member 40 transmits a light transmission cover 11 which is provided at the opening part 10 of the cabinet 1, and goes to the front glass 200. The display light L which reaches and is reflected on the front glass 200 forms a virtual image of a broadcast image (a display image which is visually recognized by an observer E) at a front position F (refer to FIG. 1) of the front glass 200, and transmits the light from the front side. In this manner, the HUD device 100 can cause the observer (mainly, a driver of a vehicle) to visually recognize both of the virtual image and a landscape of the outside actually existing at the front side or the like.

The reflection unit rotation mechanism 5 rotates the reflection unit 4 about a rotation axis AX, and as shown in FIG. 2 (a) and FIG. 2 (b) or the like, this mechanism is provided with a first supporting member 7, a second elastic member S1, a second supporting member 9, and a second elastic member S2.

Figure 6:
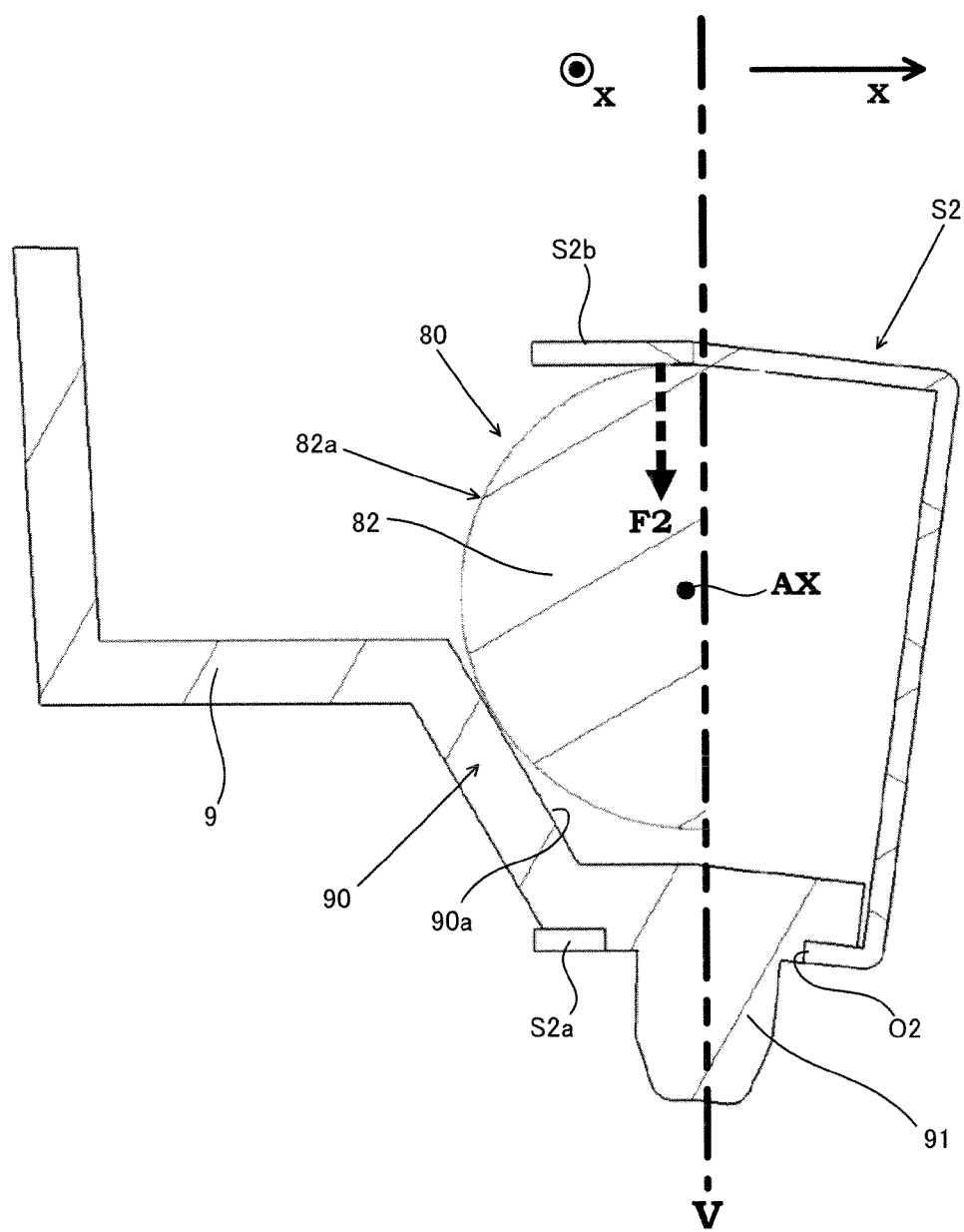
FIG. 6 is a sectional view taken along the line D-D shown in FIG. 5, of a partial configuration of the reflection unit and the reflection unit rotation mechanism.

It is to be noted that, in FIG. 2 (a) and FIG. 2 (b) to FIG. 6, the X-axis parallel to the rotation axis AX was indicated by the arrow. Hereinafter, in order to facilitate an understanding of the constituent elements of the reflection unit rotation mechanism 5, the constituent elements of the reflection unit rotation mechanism 5 will be described as required, assuming that a direction indicated by the arrow, representing the X-axis, is a "positive X-direction", and an opposite direction thereto is a "negative X-direction".

The first supported member 6 that is provided at the reflection unit 4 is a member which is formed of a predetermined resin, for example, and which is rotatably supported on the first supporting member 7 about the rotation axis AX. The first supported member 6 is mounted to a side end part in the negative X-direction of the reflection member 40, and is mounted to be thereby immobilized with respect to the reflection member 40 (it is to be noted that the first supported member 6 may be formed integrally with the reflection unit 4). At the first supported member 6, a first supported part 60 which is a portion protruding in the negative X-direction is provided (refer to FIG. 2 (b) and FIG. 4). The first supported part 60 will be described later in detail.

The first supporting member 7 is a member which is formed of a predetermined resin, for example, and which is supported to the cabinet 1 to be thereby immobilized with respect to the cabinet 1; and supports the first supported body 6. At the first supporting member 7, a first supporting part 70 (refer to FIG. 2 (b)) which is a portion abutting against the first supported part 60 and supporting the first supported part 60 is provided. The first supporting part 70 will be described later in detail.

Also, the first supporting member 7 is constituted as a member to retain a motor 71 and a gear 72. The motor 71 generates a driving force for rotating the reflection unit 4 about the rotation axis AX, and is made of a stepping motor, for example. To a rotary shaft (not shown) of the motor 71, as shown in FIG. 2 (a) and FIG. 2 (b), a setscrew 71a is mounted. The gear 72 is rotatably retained to the first supporting member 7 about an axis parallel to the rotation axis AX via a shaft 73 about the X-direction, and is securely tightened with the setscrew 71a. The gear 72 is also securely tightened with a gear part 62 which is formed at the first supported member 6. When the setscrew 71a is rotated by the motor 71, the gear 72 that is securely tightened therewith rotates. The gear 72 is also securely tightened with the gear part 62 that is formed at the first supported member 6 of the reflection unit 4, and therefore, the reflection unit 4 is rotated about the rotation axis AX by the driving force of the motor 71.

In so far as the rotation part rotation mechanism is concerned, the driving force of the motor 71 is thus transmitted to the reflection unit 4 via the setscrew 71a and the gear 72 to be thereby able to rotate the reflection unit 4 about the rotation axis AX.

Figure 4:
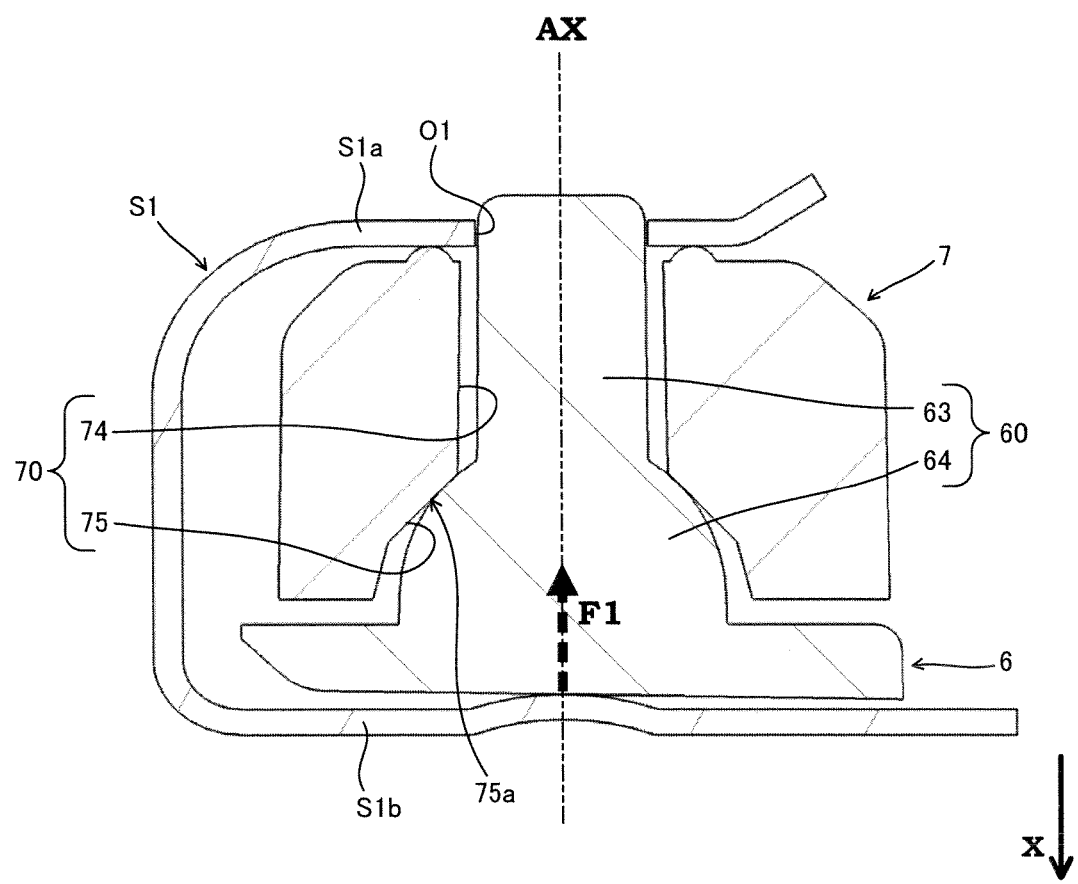
FIG. 4 is a sectional view taken along the line C-C shown in FIG. 3, of a partial configuration of the reflection unit and the reflection unit mechanism.

A first elastic member S1 (one example of an elastic member) is made of a plate screw, for example, and as shown in FIG. 4, this elastic member forms a sectional substantial U-shape. The first elastic member S1 is arranged so as to press the first supported part 60 against the first supporting part 70. The first elastic member S1 will be described later in detail.

The second supported member 8 that is provided at the reflection unit 4 is a member which is rotatably supported on the second supporting member 9 about the rotation axis AX. The second supported member 8 is positioned at a side end part in the positive X-direction of the reflection unit 4, and is immobilized with respect to the reflection member 40. The second supported member 8 is formed integrally with the reflection member 40, for example, or alternatively, is fixed to the reflection member 40. The second supported member 8 has a second supported part 80 protruding in the positive X-direction (refer to FIG. 2 (b) and FIG. 6). The second supported part 80 will be described later in detail.

The second supporting member 9 is a member which is formed of a predetermined resin, for example, and which is mounted to the cabinet 1 to be thereby immobilized with respect to the cabinet 1; and supports the second supported member 8. At the second supporting member 9, a second supporting part 90 (refer to FIG. 2 (b)) which is a portion abutting against the second supported part 80 and supporting the second supported part 80 is provided. The second supporting part 90 will be described later in detail.

A second elastic member S2 (one example of another elastic member which is provided at another position different from that of the first elastic member S1) is made of a plate spring, and as shown in FIG. 6, this elastic member forms a sectional substantial U-shape. The second elastic member S2 is arranged so as to press the second supported part 80 against the second supporting part 90. The second elastic member S2 will be described later in detail.

The circuit board, which is not shown, is a printed circuit board which is arranged at a predetermine position in the cabinet 1, for example, and which mounts a control unit (not shown) made of microcontrollers including a storage unit such as CPU and ROM. The control unit of the circuit board is electrically connected to each of the display unit 2 and the motor 71. The control unit acquires vehicle state information which is transmitted from an external device (not shown) such as a vehicle ECU (Electronic Control Unit) by way of a communication line, and drives the display unit 2 in accordance with this information (namely, a predetermined broadcast image is displayed on the display unit 2). Also, at the HUD device 100, input means (not shown) for a user such as observer E to adjust an angle of the reflection unit 4 is provided (this input means may be an external device of the HUD device 100, which is electrically connected to the control unit), and according to operational contents from the input means by the user, the control unit drives the motor 71, and rotates the rotary shaft of the motor 71 by a predetermined angle. In this manner, the reflection unit 4 is turnable about the rotation axis AX.

Hereinafter, the first supported part 60, the first supporting part 70, and the first elastic member S1, and the second supported part 80, the second supporting part 90, and the second elastic member S2 will be described in detail.

(Description of First Supported Part 60, First Supporting Part 70, and First Elastic Member S1)

Figure 3:
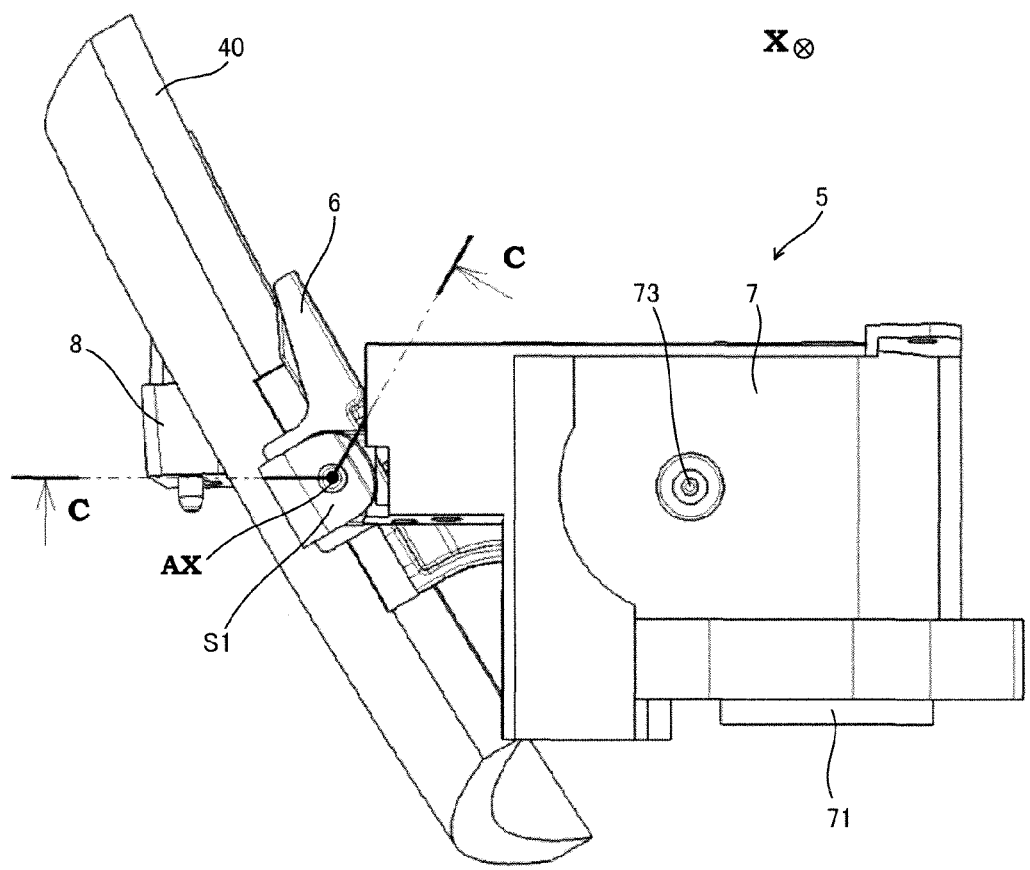
FIG. 3 is a view in a case where the reflection unit and the reflection unit rotation mechanism are seen in a direction indicated by the arrow A shown in FIG. 2 (a).

First, with reference to FIG. 4, the first supported part 60, the first supporting part 70, and the first elastic member S1 will be described. FIG. 4 is a sectional view taken along the line C-C shown in FIG. 3, of the reflection unit rotation mechanism 5.

The first supported part 60 is provided at one end part of the reflection unit 4 (an end part at the negative X-direction's side) along the rotation axis AX, and forms a shape (a protrusion shape) protruding in the negative X-direction. On the other hand, the first supporting part 70 to support the first supported part 60, as shown in FIG. 4, is formed as a hole part (a recessed part) into which the first supported part 60 is to be inserted.

Specifically, the first supported part 60, as shown in FIG. 4, is composed of: a cylindrical axis part 63; and a spherical part 64 having a spherical surface which is formed at the positive X-direction's side of the axis part 63. On the other hand, the first supporting part 70 is composed of: a first hole part 74 which houses the axis part 63, and which is made of a cylindrical hole slightly larger than the axis part 63; and a second hole part 75 communicating with the first hole part 74, and housing the spherical part 64. An interior surface forming the second hole part 75 of the first supporting part 70 is in a shape along a side surface of a predetermined conical member (preferably, a triangular pyramid or a circular cone) having a height direction in the rotation axis AX direction, and forms a sliding surface 75a against which the spherical part 64 of the first supported part 60 abuts, and which slides the spherical part 64 concurrently with rotation about the rotation axis AX of the reflection unit 4. In this manner, a contact between the first supported part 60 and the first supporting part 70, namely, a contact between the spherical part 64 and the sliding surface 75a is substantially in a point contact or linear contact state, and the first supported part 60 is rotatably supported by the first supporting part 70 in a manner that a contact resistance is restrained to the minimum.

In the first elastic member S1, as shown in FIG. 4, one end part S1a thereof is fixed at the negative X-direction's side of the first supporting member 7, and the other end part S1b thereof biases the first supported part 60 at the negative X-direction's side. Namely, the first elastic member S1 imparts a force F1 at the negative X-direction's side to the first supported part 60, and presses the spherical part 64 of the first supported part 60 against the sliding surface 75a of the first supporting part 70. In this manner, the first supported part 60 is pressed in a direction along the rotation axis AX by way of the elasticity of the first elastic member S1 and the first supported part 60 and the first supporting part 70 are substantially in a point-contact or linear-contact state, and a gap is eliminated therebetween and thus a backlash is reduced, and further, even in a case where vibration is imparted to the HUD device 100, shaking of a broadcast image (a display image) which is visually recognized by the observer E is restrained.

Also, at one end part S1*a* of the first elastic member S1, there is formed a bearing part O1 made of a hole part to rotatably pivot the axis part 63 of the first supported part 60.

(Description of Second Supported Part 80, Second Supporting Part 90, and Second Elastic Member S2)

Figure 5:
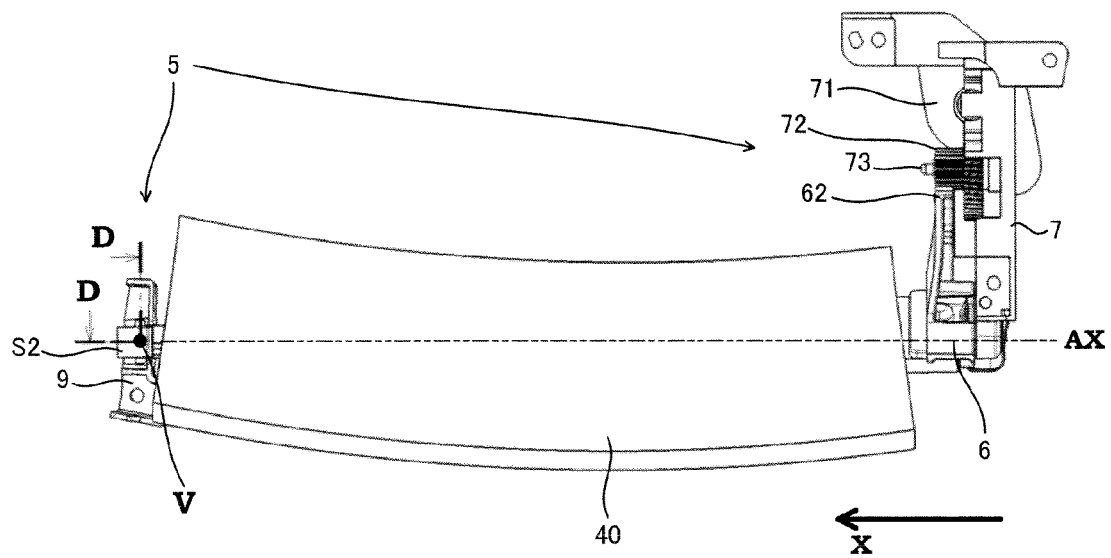
FIG. 5 is a view in a case where the reflection unit and the reflection unit mechanism are seen in a direction indicated by the arrow B shown in FIG. 2 (a).

Next, with reference to FIG. 6, the second supported part 80, the second supporting part 90, and the second elastic member S2 will be described. FIG. 6 is a sectional view taken along the line D-D shown in FIG. 5, of the reflection unit rotation mechanism 5. It is to be noted that a vertical line V passing through a crossing point of the line D-D orthogonal to each other was shown in FIG. 5 and FIG. 6. In the sectional view of FIG. 6, at the left side from the vertical line V, the X-axis is oriented in the sheet normal line direction, and at the right side from the vertical line V, the X-axis is oriented to the right side.

Figure 7:
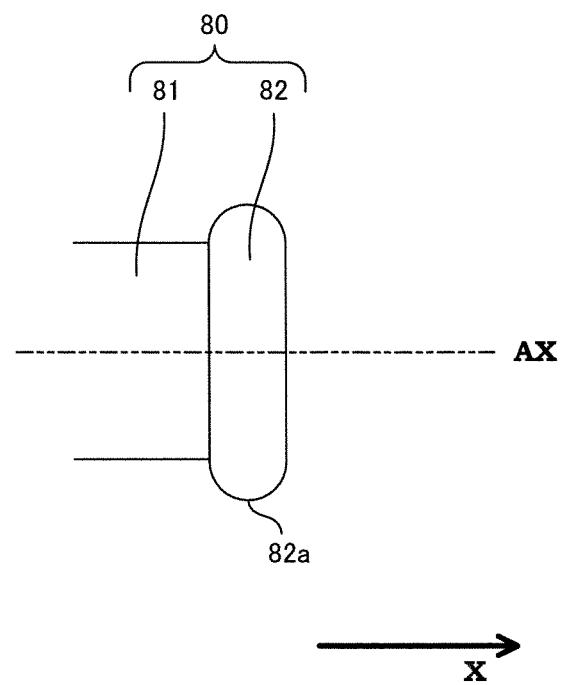
FIG. 7 is a view for explaining a shape of the second supported part.

The second supported part 80 is provided at the other end part of the reflection unit 4 (an end part at the positive X-direction's side) along the rotation axis AX, and forms a shape protruding in the positive X-direction, and specifically, as shown in FIG. 7, this supported part is composed of a cylindrical axis part 81; and a disk part 82 which is formed at the positive X-direction's side of the axis part 81. The disk part 82, as shown in FIG. 6, is formed in a circular shape when the disk part is seen in the positive X-direction, and as shown in FIG. 7, the disk part is formed so as to be in a flange-like protrusive shape more significantly than the axis part 81 when the disk part is seen in a direction which is orthogonal to the rotation axis AX. As shown in FIG. 7, the side periphery of the disk part 82 is a curved surface part 82*a* having a spherical curved surface. The second supported part 80 is supported by the disk part 82 (speaking in more detail, the curved surface part 82*a*) abutting against the second supporting part 90. Of the second supporting part 90, a portion against which the curved surface part 82*a* of the second supported part 80 abuts is formed in a shape along a side surface of a predetermined conical member (preferably, a triangular pyramid or a cone), and is a sliding surface 90*a* to slide the disk part 82 of the second supported part 80 concurrently with rotation about the rotation axis AX of the reflection unit 4 (one example of another sliding surface which is provided at another position different from that of the sliding surface 75*a*). In this manner, a contact between the second supported part 80 and the second supporting part 90, namely, a contact between the disk part 82 and the sliding surface 90*a* is substantially in a point contact or linear contact state, and the second supported part 80 is rotatably supported by the second supporting part 90 in a manner that a contact resistance is restrained to the minimum.

In so far as the second elastic member S2 is concerned, one end part S2*a* thereof is positioned and fixed utilizing a protrusion part 91, which will be described later, provided at the second supporting member 9 (refer to the lower side in FIG. 6), and the other end part S2*b* thereof biases the second supported part 80 toward the lower side in FIG. 6. Namely, the second elastic member S2 imparts a force F2 to the second supported part 80 in a direction which is orthogonal to the rotation axis AX, and presses the disk part 82 of the second supported part 80 against the sliding surface 90*a* of the second supporting part 90. In this manner, the second supported part 80 is pressed in the direction that is orthogonal to the rotation axis AX by way of the elasticity of the second elastic member S2 and then is substantially in a point contact or linear contact state with the second supported part 80 and the second supporting part 90, and a gap is eliminated therebetween to thus reduce a backlash, and further, even in a case vibration is imparted to the HUD device 100, shaking of the broadcast image that is visually recognized by the observer E is restrained.

Also, at one end part S2*a* of the second elastic member S2, a cutout O2 is formed. This cutout 2 is formed at the second supporting member 9, and is engaged with the protrusion part 91 protruding in the downward direction in FIG. 2 (*a*) and FIG. 2 (*b*) or FIG. 6.

In the HUD device 100 described hereinbefore, at the first supported part 60*a*, a spherical surface (which is included in the spherical part 64) is formed; at the first supporting part 70, there is formed the sliding surface 75*a* that is a surface substantially coming into point contact or linear contact with the spherical surface formed at the first supported part 60, and that is a surface for the first supported part 60 to slide concurrently with rotation of the reflection unit 4; and there is provided the first elastic member S1 to press the first supported part 60 and the first supporting part 70 against each other in the rotation axis AX direction. In this manner, the first supported part 60 and the first supporting part 70 are restrained while abutting against each other, and the thus restraining member is the first elastic member S1, and therefore, even if vibration is imparted to the HUD device 100, it is possible to reduce an occurrence of a displacement with the reflection unit 4 (in particular, a displacement in the rotation axis AX direction), and vibration can be absorbed by the first elastic member S1, and as a result, an occurrence of a displacement of a display image is reduced.

Also, the sliding surface 75*a* that is formed at the first supporting part 70 is in a shape along a side surface of a cone or a triangular pyramid having a height direction in a direction along the rotation axis AX. In this manner, if the spherical part 64 is biased in the rotation axis AX direction (the negative X-direction), a center of the spherical part 64 is aligned with a central axis of the cone or the triangular pyramid in which a part of a side surface is coincident with the sliding surface 75*a* (so called self-centering), and the reflection unit 4 can stably rotate about the rotation axis AX.

In addition, as is the first supported part 60 and the first supporting part 70 at the negative X-direction's side of the reflection unit 4, in the HUD device 100, a spherical surface (which is included in the curved surface part 82*a*) is formed at the second supported part 80; at the second supporting part 90, there is formed the sliding surface 90*a* that is a surface substantially coming into point contact or linear contact with the spherical surface that is formed at the second supported part 80, and that is a surface for the second supported part 80 to slide concurrently with rotation of the reflection unit 4; and there is provided the second elastic member S2 to press the first supported part 80 and the second supporting part 90 in a direction which is orthogonal to the rotation axis AX direction, against each other concurrently with rotation of the reflection unit 4. In this manner, a backlash in the rotation axis AX direction can be absorbed by the first elastic member S1, and a backlash in a direction which is orthogonal to the rotation axis AX direction can be absorbed by the second elastic member S2, making it possible to maintain a state in which the first supported part 60 abuts against the first supporting part 70, and the second supported part 80 abuts against the second supporting part 90. Thus, even in a case where a large vibration is imparted to the HUD device 100, displacement of the reflection unit 4 can be well reduced, and as a result, displacement of a display image that is visually recognized can be well reduced.

Further, in the HUD device 100, the first supporting member 7 at which the first supporting part 70 is provided functions as a holder to hold driving means (such as the motor 71 or the gear 72) for rotating the reflection unit 4 as well. In this manner, it is possible to well manage a failure exerted by a backlash between a part constituting the driving means and a part coupling to the reflection unit 4 (for example, a backlash between the gear 72 and the gear part 62 that is provided at the first supported part 60) (to easily design the HUD device is easily designed so as to prevent a failure in advance, etc.).

It is to be noted that the present invention is not limited by the above embodiment and drawings. It is a matter of course that various modifications (including deletion of a constituent element) can be made thereto.

Although the foregoing description explained a construction in which a supporting part has a sliding surface, and a supported part has a spherical phase, the present invention is not limitative thereto. A construction in which a supported part has a sliding surface, namely, a construction in which a relationship in irregularities between a supporting part and a supported part is reversed may be employed in the HUD device 100. That is, in a HUD device 100 according to Modification Example, a spherical surface may be formed at the first supporting part 70, and at the first supported part 60, there may be formed a sliding surface which is a surface substantially coming into point contact or linear contact with the spherical surface formed at the first supporting part 70, and which slides with respect to the first supporting part 70 concurrently with rotation of the reflection unit 4. This is also true as to a relationship between the second supported part 80 and the second supporting part 90.

Furthermore, although the foregoing description showed an example in which an elastic member (the first elastic member S1, the second elastic member S2) is made of a plate spring, the elastic member may be made of a tension spring or the like.

Still furthermore, although the foregoing description showed an example of reflecting the display light L from the display unit 2 by the flat surface mirror 3 and then causing the reflected light to reach the reflection unit 4, the present invention is not limitative thereto. The HUD device 100 may be configured so as to cause the display light L from the display unit 2 to directly reach the reflection unit 4 without having the flat surface mirror 3.

Although the foregoing description showed a motor vehicle as one example of a vehicle installing the HUD device 100, the present invention is not limitative thereto. A HUD device 1 can be installed near a driver's seat of another vehicle such as a ship or an aircraft.

Yet furthermore, although the foregoing description showed an example in which the display light L that is reflected by the reflection unit 4 is projected to the front glass 200, the present invention is not limitative thereto. The display light L that is reflected by the reflection unit 4 may be projected to a transmission reflection member (a so called combiner) exclusively used for the HUD device 100.

In the foregoing description, in order to facilitate an understanding of the present invention, an explanation of publicly known technical matters which are not essential was appropriately omitted.

INDUSTRIAL APPLICABILITY

The present invention is applicable to a head-up display device in which display light representing a predetermined image emitted from a display unit is reflected by a reflection unit, and by the display light reflected by the reflection unit, a virtual image of the image can be visually recognized to be superimposed on a landscape of a front side.

DESCRIPTION OF REFERENCE NUMERALS

100 HUD device
1 Cabinet
2 Display unit
3 Flat surface mirror
4 Reflection unit
40 Reflection member
6 First supported member
60 First supported part
63 Axis part
64 Spherical part
8 Second supported member
80 Second supported part
81 Axis part
82 Disk part
82a Curved surface part
5 Reflection unit rotation mechanism
7 First supporting member
70 First supporting part
74 First hole part
75 Second hole part
75a Sliding surface
S1 First elastic member
71 Motor
72 Gear
9 Second supporting member
90 Second supporting part
90a Sliding surface

The invention claimed is:

1. A head-up display device in which display light representing a predetermined image emitted from a display unit is reflected by a reflection unit, and by the display light that is reflected by the reflection unit, a virtual image of the predetermined image can be visually recognized, the head-up display device comprising:
a supporting part to rotatably support the reflection unit about a determined rotation axis; and
a supported part which is provided at one end part of the reflection unit along the rotation axis, and which is supported by the supporting part,
wherein a spherical surface is formed at the supported part,
a sliding surface which is a surface substantially coming into point contact or linear contact with the spherical surface that is formed at the supported part, and which is a surface for the supported part to slide concurrently with rotation of the reflection unit, is formed at the supporting part,
an elastic member to press the supported part and the supporting part against each other in the rotation axis direction is provided, and
the sliding surface that is formed at the supporting part is in a shape along a side surface of a cone or a triangular pyramid having a height direction along the rotation axis.

2. The head-up display device according to claim 1, further comprising:

a second supported part which is provided, in a case where the supporting part is defined as a first supporting part, and the supported part is defined as a first supported part, at an end part opposite to the first supported part of the reflection unit along the rotation axis; and a second supporting part to rotatably support the second supported part about the rotation axis, wherein a spherical surface is formed at the second supported part, a sliding surface which is a surface substantially coming into point contact or linear contact with the spherical surface that is formed at the second supported part, and which is a surface for the second supported part to slide concurrently with rotation of the reflection unit, is formed at the second supporting part, and an elastic member to press the second supported part and the second supporting part against each other in a direction which is orthogonal to the rotation axis is provided.

3. A head-up display device in which display light representing a predetermined image emitted from a display unit is reflected by a reflection unit, and by the display light that is reflected by the reflection unit, a virtual image of the predetermined image can be visually recognized, the head-up display device comprising:

a supporting part to rotatably support the reflection unit about a determined rotation axis;

a supported part which is provided at one end part of the reflection unit along the rotation axis, and which is supported by the supporting part;

a second supported part which is provided, in a case where the supporting part is defined as a first supporting part, and the supported part is defined as a first supported part, at an end part opposite to the first supported part of the reflection unit along the rotation axis; and a second supporting part to rotatably support the second supported part about the rotation axis, wherein a spherical surface is formed at the supported part, a sliding surface which is a surface substantially coming into point contact or linear contact with the spherical surface that is formed at the supported part, and which is a surface for the supported part to slide concurrently with rotation of the reflection unit, is formed at the supporting part, an elastic member to press the supported part and the supporting part against each other in the rotation axis direction is provided, a spherical surface is formed at the second supported part, a sliding surface which is a surface substantially coming into point contact or linear contact with the spherical surface that is formed at the second supported part, and which is a surface for the second supported part to slide concurrently with rotation of the reflection unit, is formed at the second supporting part, an elastic member to press the second supported part and the second supporting part against each other in a direction which is orthogonal to the rotation axis is provided, and the sliding surface that is formed at the second supporting part is in a shape along a side surface of a cone or a triangular pyramid.

4. The head-up display device according to claim 3, further comprising a gear for rotating the reflection unit and a holder to hold the gear, wherein the first supporting part is provided at the holder.

5. The head-up display device according to claim 3, further comprising a gear for rotating the reflection unit and a holder to hold the gear, wherein the first supporting part is provided at the holder.

* * * * *